United States Patent
Hord

(10) Patent No.: US 7,168,146 B2
(45) Date of Patent: Jan. 30, 2007

(54) PROCESS FOR MAKING AN ACCESS HATCH

(76) Inventor: Richard W. Hord, P.O. Box 412625, Kissimmee, FL (US) 34742

( * ) Notice: Subject to any disclaimer, the term of this patent is extended or adjusted under 35 U.S.C. 154(b) by 301 days.

(21) Appl. No.: 10/874,130

(22) Filed: Jun. 22, 2004

(65) Prior Publication Data

US 2005/0278935 A1    Dec. 22, 2005

(51) Int. Cl.
*B23P 11/00* (2006.01)
*B29C 45/14* (2006.01)

(52) U.S. Cl. .................. 29/434; 29/527.1; 29/527.2; 264/273

(58) Field of Classification Search ............... 29/527.2, 29/527.1, 434; 264/242, 273, 276, 279
See application file for complete search history.

(56) References Cited

U.S. PATENT DOCUMENTS 4,861,540 A * 8/1989 Nieboer et al. ............. 264/263
4,896,467 A * 1/1990 McGinnis .................... 52/107
6,216,881 B1 * 4/2001 Schaller ...................... 210/540
6,398,995 B1 * 6/2002 Eisenlord et al. ............ 264/45.7

* cited by examiner

*Primary Examiner*—David P. Bryant
*Assistant Examiner*—Sarang Afzali
(74) *Attorney, Agent, or Firm*—William M. Hobby, III

(57) ABSTRACT

A process of making a hinged access hatch for use in marine and RV industries includes selecting a stainless hinge having a pair of leaves and rotating on a pentel or pivot pin and placing a portion of one leaf of the selected hinge into an access hatch door mold and sealing around said one leaf extending into said access door hatch mold to prevent plastic in said mold from contacting the moving portion of said hinge. The access hatch door is then molded in the access hatch mold having a portion of the one leaf of the hinge molded therein. The molded access hatch door has been removably attached to an access hatch frame by attaching fasteners through the plurality of openings in the other hinge leaf whereby an access hatch eliminates the need for hinge door fasteners while improving the strength of the access hatch door attachment to the access hatch frame.

4 Claims, 2 Drawing Sheets

PROCESS FOR MAKING AN ACCESS HATCH

BACKGROUND OF THE INVENTION

The present invention relates to a process of making a hinged access hatch and especially to a process of making an injection molded plastic access hatch for the marine and RV industries having a hinge molded thereinto. Access hatches and cover plates have been widely used in the marine and RV industries for providing access to below deck storage holes and compartments behind bulkheads, walls and panels. Equipment, such as shutoff valves, electrical switches, and monitoring gauges are located in protected areas below a boat deck or behind bulk heads to protect such equipment from salt spray, inadvertent contact, and unauthorized handling. Easy access to such storage holes and compartments is required to allow equipment therein to be worked on, calibrated or checked and in addition hatch doors are generally formed with an O-ring seal to keep such equipment therein dry, safe and readily accessible. Thus, an access door frame generally has a gasket or O-ring type seal and a hatch door which is typically hinged with a hinge which has been connected with threaded fasteners to the door and to the frame so that the hatch can be opened and closed for working on or viewing or checking the equipment stored thereunder. Frequently persons working in the hatch have to lean on the door, putting pressure on the hinges which can result in threaded fasteners attaching the hinges to the door being stripped out of the plastic or wooden hatch door. It is also desirable to have the hatch doors removable, such as by unfastening screws so that easier access can be had when working on the equipment therebelow. Conventional deck plate and hatch designs typically include a separate seating ring or gasket which is attached to the door frame or to the deck for sealing the hatch door. The hatch is a separate member which is usually attached with hinges and separate threaded fasteners, such as screws. A seal is usually provided with a separate O-ring or gasket to seal between the hatch door and the frame or deck surface to provide a weathertight system.

The present invention is directed towards a system for providing a plastic access hatch for use in the marine or RV industries which include the hatch door hingedly fastened to a frame which is then attached as an OEM product to a marine vessel or to a recreational vehicle. The process for making the access hatch includes the step of molding a portion of each hinge into the access door and then fastening the hinge to the frame with removable threaded fasteners. The complete unit with the access hatch and its frame and seals can then be attached to a marine or recreational vehicle.

SUMMARY OF THE INVENTION

A process of making a hinged access hatch for use in marine and RV industries includes selecting a stainless hinge having a pair of leaves and rotating on a pintle or pivot pin and placing a portion of one leaf of the selected hinge into an access hatch door mold and sealing around the one leaf extending into the excess door hatch mold to prevent molten plastic in the mold from contacting the moving portion of the hinge. The access hatch door is then molded in the access hatch mold having a portion of the one leaf of the hinge molded therein. The molded access hatch door is then removably attached to an access hatch frame by attaching fasteners through the plurality of openings in the other hinge leaf whereby an access hatch eliminates the need for hinge door fasteners while improving the strength of the access hatch door attachment to the access hatch frame.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
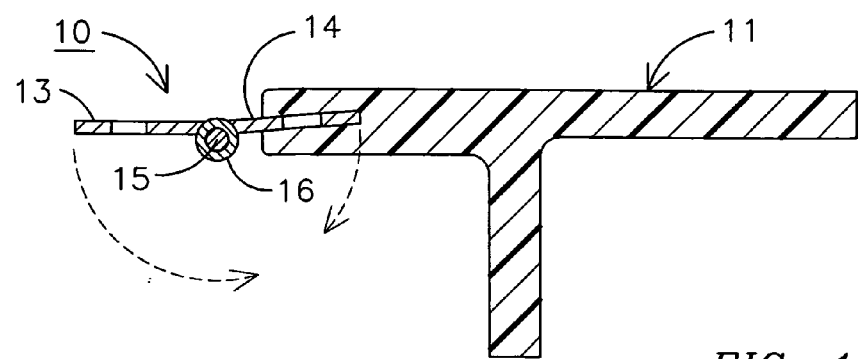
FIG. 1 is a sectional view of a portion of an access hatch door having a hinge molded therein.
Figure 2:
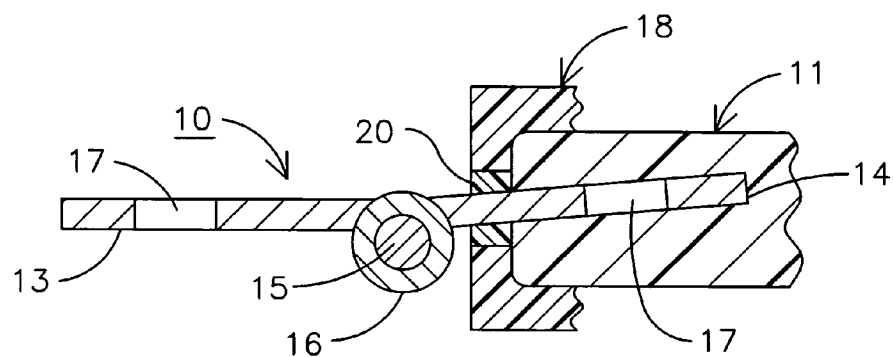
FIG. 2 is a sectional view of a hinge mounted in a mold which has had a portion of an access hatch door molded thereinto.
Figure 3:
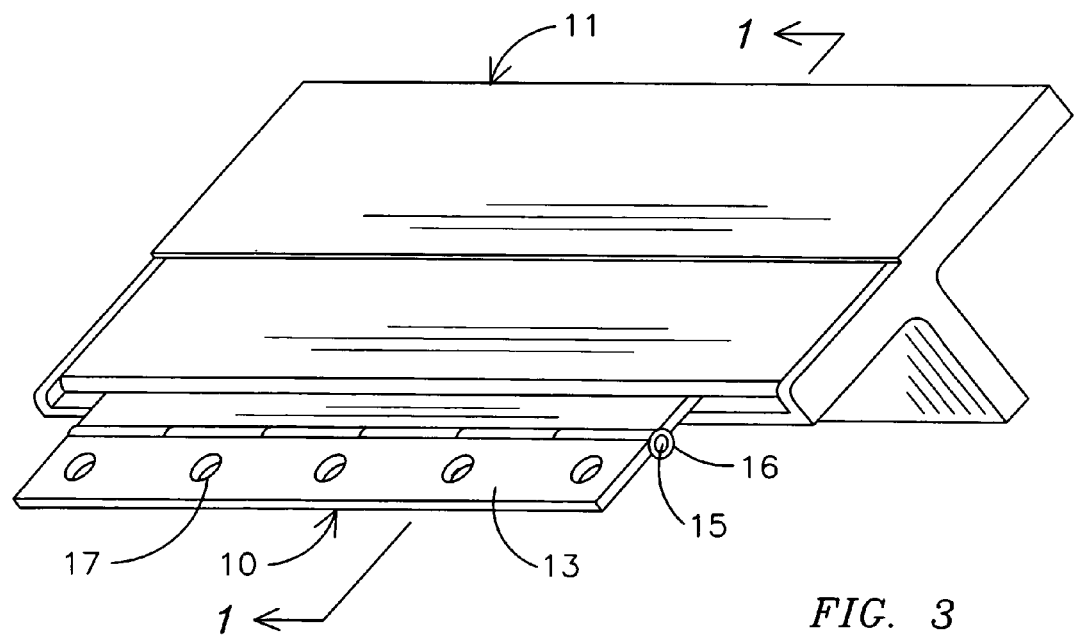
FIG. 3 is a perspective view of a door section having the hinge molded thereinto.
Figure 4:
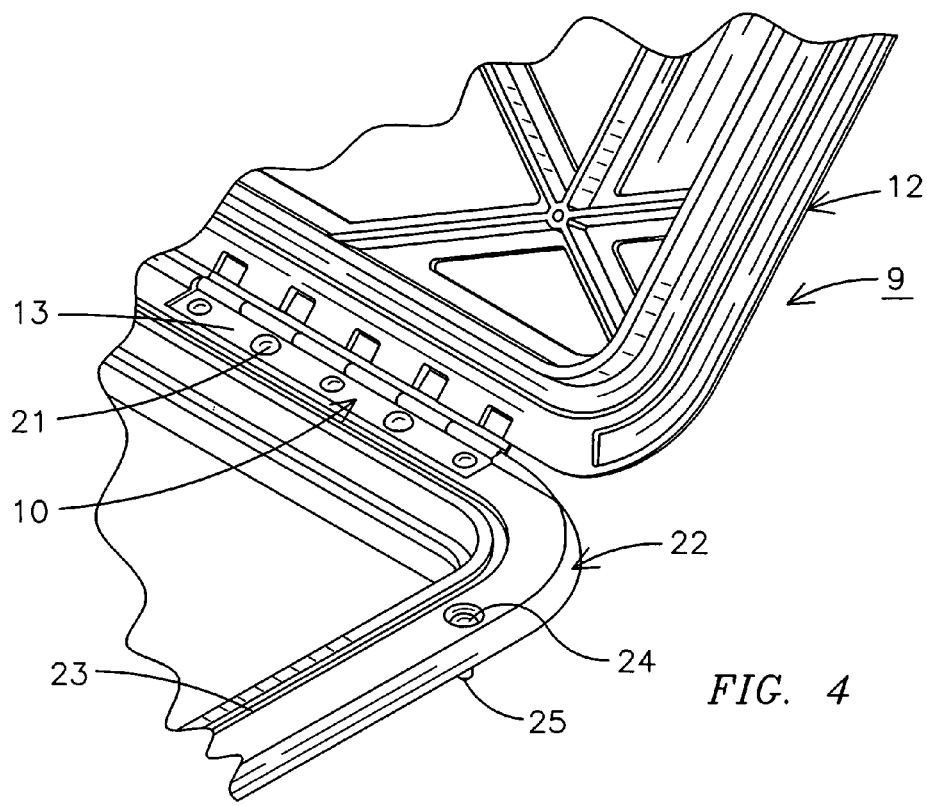
FIG. 4 is a partial perspective view of an access hatch door and frame.

Referring to the drawings FIGS. 1 through 4, a winged access hatch door and frame unit 9 has a hinge 10 being molded into an access hatch door portion 11 of an access door 12. The hinge includes a pair of hinge leaves 13 and 14 which are rotatably connected to an axially extended pintle or pivot pin 15 with a plurality of knuckles 16 wrapping therearound. Each hinge leaf 13 and 14 has a plurality of openings 17 therein. The hinge in FIG. 2 has been inserted into a mold 18 having the mold seals 20 sealing adjacent a portion of the hinge leaf 14 so that when the hatch door 12 portion 11 is molded, the flowing molten plastic from the injection mold is prevented by the seals 20 on the mold portion 18 from interfering with the rotation or movement of the hinge leaves 13 and 14 on the hinge pin 15. The hinge is molded into the access hatch door 11 with plastic extending through the openings 17 to form a permanent bond with the plastic hatch door 12. The plastic door 12 which may be formed in a precision heat treated mold using a polyolefin plastic material and a stainless steel hinge. The hinge door 12 can be seen having the hinged leaf 13 attached with a plurality of fasteners 21 passing through the opening 17 and attached to the access hatch frame 22 which has an O-ring or sealing gasket 23 for sealing against the access hatch door 12. The frame 22 is provided with a plurality of openings 24 for passing threaded fasteners 25 therethrough for attaching to an opening in a boat hull or recreational vehicle.

Figure 5:
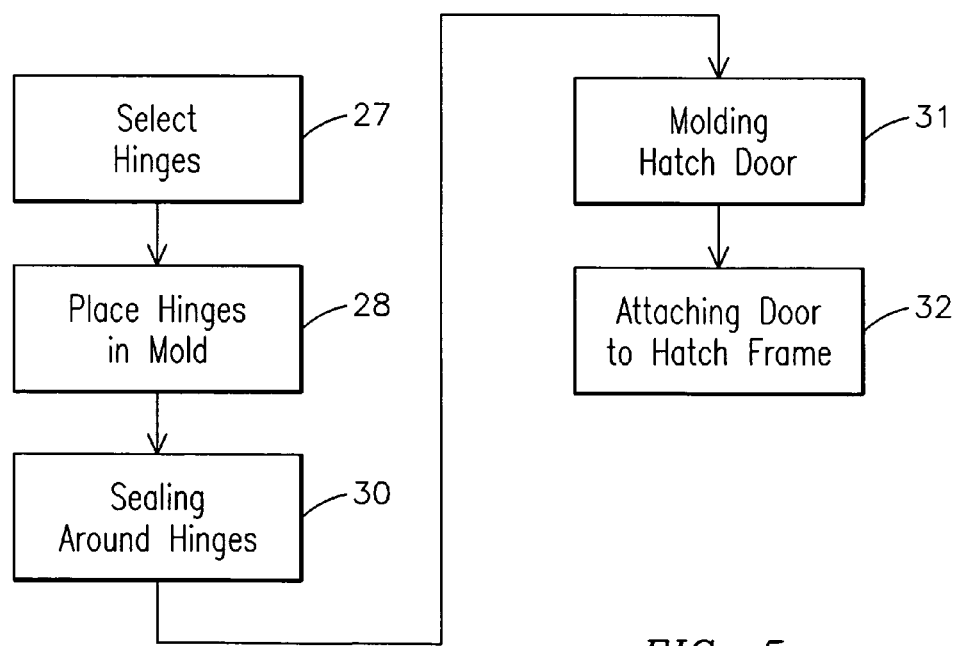
FIG. 5 is a flow diagram of the process of making a hinged access hatch.

As seen in FIG. 5, the process of making the access hatch 26 includes selecting (27) the stainless steel hinges 10 which are then placed (28) into the precision heat treated injection mold 18 and then sealing (30) with the seals 30 and the injection mold 18 around the hinge leaf 14 to prevent the molten fluid plastic 11 in the molded access hatch mold during the molding operation from interfering with the moving parts of the hinge 10. The access hatch door is then molded (31) to form an access hatch door 12 having the hinge 10 molded into the leaf 14.

The stainless steel hinges are located within the mold by proximity switches which provide a closed loop fail-safe condition within the process control system of the molding equipment. The stainless steel hinges are located by linear guides in the mold. When the molding cycle is completed, a machine operator is able to remove the finished assembly with the hinges incorporated into the access hatch. The finished access hatch then has a seamless bond between the stainless steel hinges 10 and a polyolefin plastic material 11 that will increase the strength of the connection between the hinge and the door. The process includes attaching (32) the hatch door to the hatch frame with threaded fasteners 21 through the hinge openings 17. The hatch frame 22 has been separately molded and provided with a sealing gasket 23 and openings 24 for attaching threaded fasteners 25 to a boat or the like. Testing has proven that the shear strength of the access hatch made in accordance with the present process is more than double that of hinges installed with conventional fasteners.

It should be clear at this time that a process of making an access hatch has been provided which improves the strength between the attached access hatch door and the access hatch frame while still allowing the access door to be removed from the access frame. The present access hatch allows for fastening of a stainless steel hinge through the frame and boat hull or RV frame. By fastening the hinge to the substrate rather than to the plastic frame only, the joint/bond is doubled in pull tensile strength. However, the present invention is not to be construed as limited to the forms shown which are to be considered illustrative rather than restrictive.

What is claimed is:

1. A process of making a hinged access hatch comprising:
    selecting a metal hinge having a pair of leaves rotatable on a common hinged pin, each leaf having a plurality of openings therein;
    placing the portion of one said leaf of said selected hinge with the plurality of openings therein in an access hatch door mold;
    sealing a portion of said one hinge leaf with a pair of mold seals to prevent plastic in said mold from contacting the moving portion of said hinge;
    molding an access hatch door in said access hatch door mold having said portion of said one leaf of said hinge having a plurality of openings molded by injecting plastic therein to thereby embed the plastic through said openings; and
    removably attaching said molded access hatch door to an access hatch frame by attaching fasteners through said plurality of openings in said other hinge leaf; whereby the access hatch eliminates the need for hinge door fasteners while improving the strength of said access hatch door attachment to said access hatch frame.

2. The process of making a hinged access hatch in accordance with claim 1 in which the step of selecting a hinge includes selecting a stainless steel hinge.

3. The process of making a hinged access hatch in accordance with claim 2 in which the step of molding a access hatch door includes molding an access hatch door of plastic.

4. The process of making a hinged access hatch in accordance with claim 3 in which the step of molding a access hatch door includes molding an access hatch door of polyolefin plastic.

* * * * *